Jan. 20, 1953 F. T. BARR ET AL 2,626,234
HEAT EXCHANGE OF FLUIDIZED SOLIDS WITH GASES AND VAPORS
Filed June 11, 1949 3 Sheets-Sheet 2

Frank T. Barr  Inventors
Walter A. Rex
By J. Cashman  Attorney

Patented Jan. 20, 1953

2,626,234

UNITED STATES PATENT OFFICE 2,626,234

HEAT EXCHANGE OF FLUIDIZED SOLIDS WITH GASES AND VAPORS

Frank T. Barr, Summit, and Walter A. Rex, Westfield, N. J., assignors to Standard Oil Development Company, a corporation of Delaware Application June 11, 1949, Serial No. 98,522

9 Claims. (Cl. 202—6)

The present invention relates to an improved method and apparatus for effecting a heat exchange of fluidized solids with gases and vapors at temperatures below the condensation temperature of the vapors. More specifically, the invention refers to the distillation of oil-bearing materials such as carbonizable solids of all types, particularly oil shales, but also of various coals and cellulosic materials, semi-solid or liquid oil residues or the like, in fluid operation involving a preheat of the fresh carbonaceous charge in heat exchange with volatile distillation products at temperatures below the condensation point at least of the highest boiling constituents of the volatile products.

Prior to the present invention, oil shale has been distilled in the fluidized state, i. e. in the form of subdivided solids having a particle size of 200 mesh up to large aggregates of ¼ or ½ in., fluidized by an upwardly flowing gas to form a relatively dense highly turbulent mass resembling a boiling liquid in appearance and hydrostatic and hydrodynamic characteristics. Depending on the particle size, linear superficial gas velocities of about 0.1–3 ft. per second are normally used for this purpose. Excellent heat transfer and gas-solids contact, continuity of operation, and ease of solids handling are the principal advantages of this technique.

Heat is supplied to the distillation zone usually by burning a portion of the combustibles in the shale either in the distillation zone itself or in a separate combustion zone wherein spent shale may be burned to be returned at a high temperature to the distillation zone. The former method has the advantage of a simple design while the latter permits the production of oil vapors free of combustion gases. Both methods involve the disadvantage that the volatile distillation products, strongly diluted with fluidizing and/or uncondensable flue gases, are obtained at the relatively high temperatures of about 800°–1200° F. prevailing in the distillation zone and must be intensively cooled by water cooling to permit an efficient recovery of all desirable constituents. However, major shale deposits are found almost exclusively in areas where water supply is a serious problem.

For these reasons various attempts have been made to introduce countercurrent operation into the fluid-type of shale distillation in such a manner that the volatile distillation products and fluidizing gases leaving the fluidized distillation zone proper are contacted directly with the fluidized fresh shale feed to preheat the same with concomitant cooling of the outlet vapors and gases. However, in these designs, when the heat exchange takes place at temperatures below the condensation point of major constituents of the volatile products, the liquid condensing in the fluidized shale seriously interferes with proper fluidization. It has been suggested, therefore, to maintain the heat exchange temperature above the dew point of the volatile products. However, such heat exchange is inefficient and does not avoid the necessity of further cooling with undesirably large amounts of water.

The present invention overcomes the aforementioned difficulties and affords various additional advantages. These advantages, the nature of the invention and the manner in which it is performed will be fully understood from the following description thereof read with reference to the accompanying drawing which shows semi-diagrammatic views of apparatus particularly adapted to carry out the invention.

It is, therefore, the main object of the present invention to provide an improved method for effecting a heat exchange between fluidized solids and condensing vapors.

A more specific object of the invention is to provide an improved method for preheating fresh fluidized oil shale, carbonizable material, or the like, in heat exchange with volatile distillation products.

Other and more specific objects and advantages of the present invention will appear hereinafter.

In accordance with the present invention, fresh fluidized carbonizable solids, particularly oil shale, are preheated in heat exchange with volatile distillation products leaving a distillation zone subsequently entered by the preheated solids. The minimum temperature in the heat exchange zone is maintained substantially below beginning condensation of product vapors and the maximum temperature substantially above atmospheric temperature, while the linear flow velocity of the product vapors and gases passing through the heat exchange zone is so controlled that at least a substantial proportion of the condensing liquid is entrained in the gas and vapor stream and carried out of the heat exchange zone. A temperature of about 300° to 500° F. in the heat exchange zone is normally adequate for this purpose in the case of oil shale distillation.

In accordance with the preferred embodiment of the invention, the heat exchange between the fluidized solid and the product vapors is indirect, the product vapors passing through a plurality of relatively narrow tubes imbedded in the fluidized mass of solids to be preheated, at high flow velocities of the order of about 20–100 ft. per sec. However, some of the advantages of the invention may be secured even when heat exchange by direct contact of fresh fluidized solids with product vapors is effected, provided the gas velocity in the heat exchange zone is high enough to entrain a considerable amount of the condensed liquid and the fresh feed particle size large enough to permit fluidization at such velocities of, say, about 3–10 ft. per sec. The feed of the fresh charge having a coarse particle size of, say, about ½ to 1 in. particle diameter, which is suitable for this purpose, does not interfere with the subsequent fluidization of the shale in the distillation zone proper at lower velocities because of the strong tendency of the shale to disintegrate while undergoing distillation. The present invention thus permits the application of countercurrent operation and its excellent characteristics of heat exchange and economy in continuous fluid-type shale distillation while avoiding any interference of excessive amounts of liquid condensate with proper fluidization. A particular advantage results from the beneficial influence of the relatively high gas velocities in the heat exchange zone, which substantially improve the heat transfer coefficient.

The heat required for distillation may be generated and supplied to the distillation zone in any manner known per se. It will be appreciated, however, that greatest benefits may be derived from the invention in combination with heat generation of the type which results in the production of a mixture of distillation vapors and flue gas, from which the condensable products must be separated. In this case, greatest savings in equipment and cost of operating the product recovery plant may be realized as a result of the efficient cooling and precondensation of the product vapors in accordance with the invention. In most cases, the liquid entrained in the gaseous medium leaving the heat exchange zone may be separated and recovered by centrifugal separating means, further cooling being required only for a recovery of the lowest boiling product constituents, if such recovery is desired.

Having set forth its general nature and objects, the invention will be best understood from the more detailed description hereinafter, in which reference will be made to the accompanying drawing wherein Figure 1 is a partly schematic, partly diagrammatic illustration of a system suitable for carrying out the invention using indirect heat exchange between solids feed and distillation products;

Figure 1:
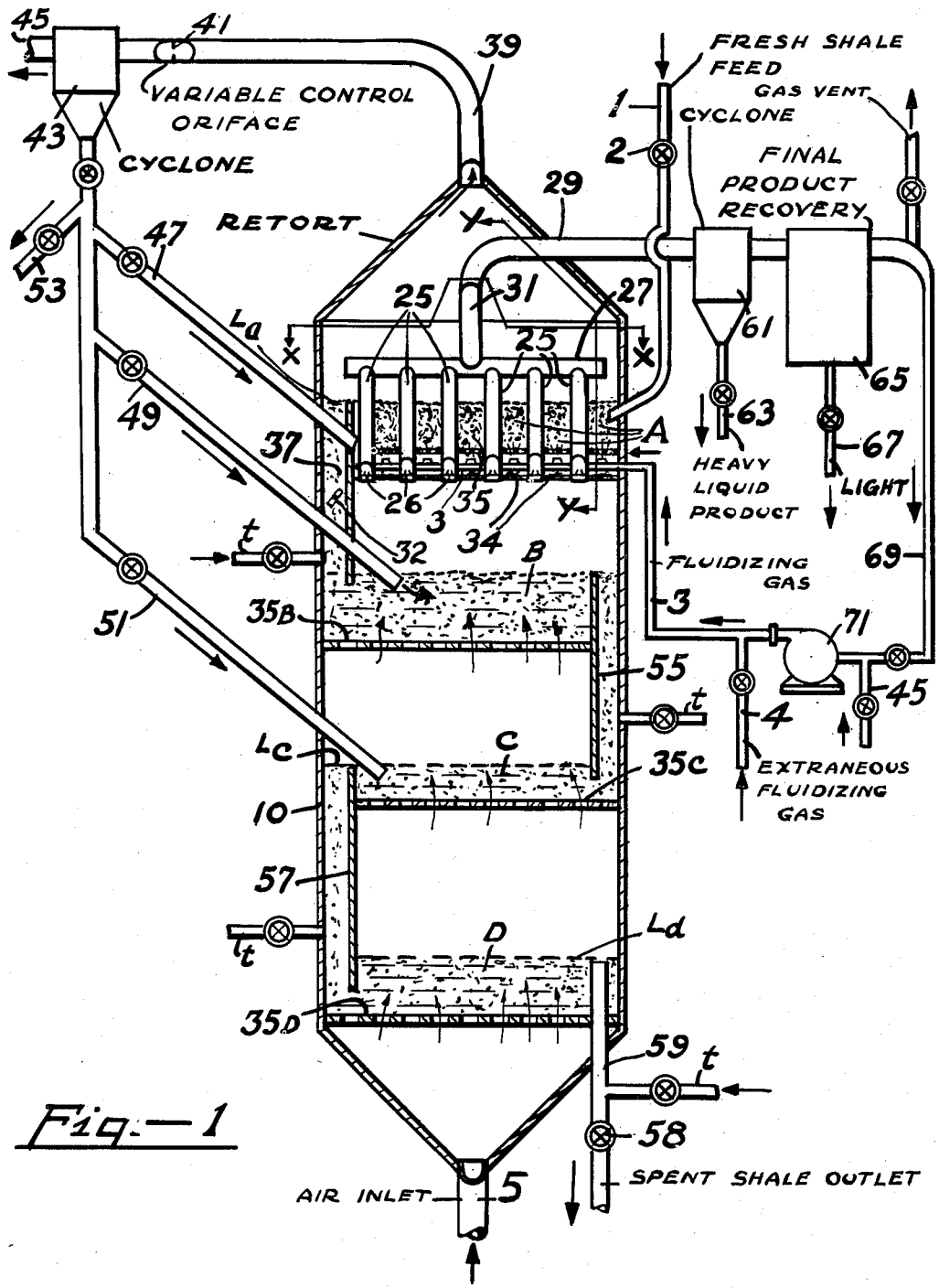
Figure 2:
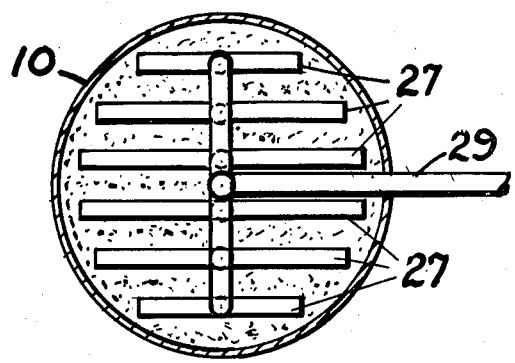
Figure 2 is a top view on bed A from level $x$—$x$ of Figure 1.
Figure 3:
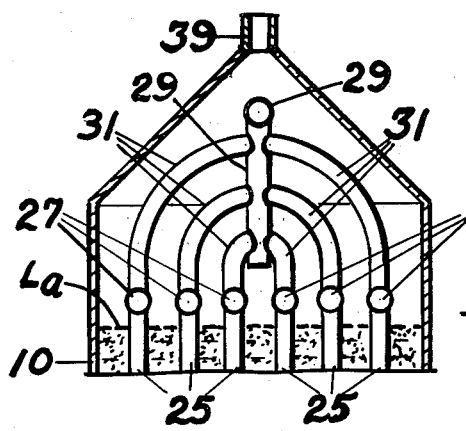
Figure 3 is a vertical section along line $y$—$y$ of Figure 1.
Figure 4:
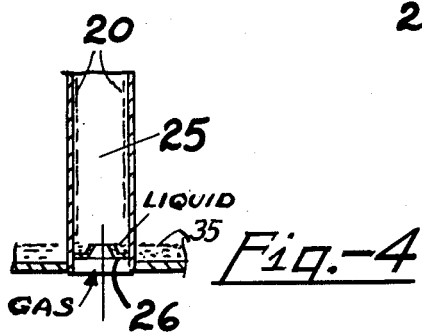
Figure 4 shows a detail of Figure 1 on an enlarged scale.

Referring now in detail to Figures 1–4, the system illustrated therein consists essentially of an elongated vertical treating chamber 10 containing several superimposed fluidized solids beds A, B, C, D, supported by perforated gas distributing plates or grids 35, 35B, 35C and 35D, respectively, and heat exchange surfaces 20 forming, in bed A, narrow passageways or tubes 25 for vapors and gases. Tubes 25 are preferably evenly distributed over the cross-sectional area of chamber 10. They may be arranged in rows each of which has a top header 27 as shown more clearly in Figure 2. Headers 27 are connected by lines 31 to product withdrawal pipe 29 as shown more clearly in Figures 2 and 3. The lower ends of tubes 25 penetrate with their lower open ends a gas-impervious bottom plate 33 and a perforated distributing means such as a grid 35 arranged above and slightly removed from plate 33. Both plate 33 and grid 35 cover the cross-sectional area of chamber 10 substantially completely with the exception of the openings of tubes 25 and an opening for a withdrawal well or wells 37, the purpose of which will appear hereinafter. Thus, the lower ends of tubes 25 communicate with the space above bed B and gases and vapors rising from bed B are forced through tubes 25, headers 27, and lines 31 to withdrawal pipe 29. In accordance with a preferred embodiment of the invention, the lower ends of tubes 25 may be provided with peripheral annular troughs 26 for collecting liquid running down the inside of surfaces 20, as shown on an enlarged scale in Figure 4. The functions and cooperation of the elements of this system will be forthwith described using the distillation of oil shale as an example. It will be understood, however, that the system may be used in a substantially analogous manner for the distillation of other carbonaceous materials and, quite generally, for the recovery of condensable volatile constituents from solids containing the same.

In operation, oil shale which may be crushed to a particle size of about 10 mesh to ¼ in. particle diameter is fed through line 1 at a point above grid 35 to chamber 10. A fluidizing gas which is preferably distillation tail gas remaining after recovery of desirable products is supplied through line 3 to the free space 34 between plate 33 and grid 35, and from there through grid 35 and the shale charged therein. The feed rate of the fluidizing gas is so controlled that the shale above grid 35 takes on the form of a dense highly turbulent mass resembling a boiling liquid having a well defined upper level $L_a$ and an apparent density of about 15–50 lbs. per cu. ft. Linear superficial gas velocities of about 0.5–5 ft. per second are suitable for this purpose depending on the shale particle size within the range mentioned above, the gas velocity being the higher the larger the particle size. If the amount of distillation tail gas available is insufficient for this purpose, extraneous fluidizing gas may be added through line 4. Fluidizing gas leaving level $L_a$ enters the upper conical portion of chamber 10 and is withdrawn therefrom through line 39 which may be provided with a variable control orifice 41 for maintaining the desired pressure conditions in retort 10. If desired, the gases may be passed from line 39 through a gas-solids separator, such as cyclone separator 43, prior to being vented or recycled to line 3, via line 45. Any shale entrainment which is separated in cyclone 43 may be returned through lines 47, 49, and/or 51 to any one or all of beds A, B and C. Shale fines of undesirably small size may be withdrawn from the system through line 53.

When the shale bed A reaches the level of the upper end of withdrawal well 37, the shale overflows through well 37 into the lower bed B, from there through a similar overflow well 55 to bed C, thence through overflow pipe 57 to bed D, and finally leaves bed C and chamber 10 through well 59. Beds B, C and D are fluidized by gases flowing upwardly through grids 35B, 35C and 35D as will appear more clearly hereinafter. The bed levels of these beds are controlled by the shale feed and withdrawal rate to and from chamber 10, controlled by valves 2 and 58, respectively, and by the position of the upper ends of wells 37, 55, 57 and 59. The lower ends of wells 37, 55 and 57 are located at points not above, and preferably below, the upper ends of wells 55, 57 and 59, respectively, so that a fluidized solids seal is maintained in all wells. Small amounts of an aerating gas such as distillation tail gas, air, and/or steam may be supplied through taps $t$ to the overflow wells to facilitate the flow of solids therethrough.

It may be desirable to obtain countercurrent flow of the gases and vapors inside tubes 25 with the fresh shale in bed A. This is facilitated by the baffling effect of the tubes on bed A, but means must be provided for discharge of the solids near the bottom rather than the top of bed A. This may be accomplished by locating the inlet to well 37 at about the level of grid 35. In this case solids flow may be controlled by means of valve 32, which, however, need not be employed if the bed level is maintained by the height of the inlet to well 37. In obtaining this counter-current flow it is also desirable to provide a plurality of wells 37 spaced evenly around bed A. The fresh shale feed through line 1 should enter near the top of bed A.

Shale distillation in chamber 10 takes place as follows. A combustion-supporting gas, such as air, oxygen, or air enriched with oxygen is supplied through line 5 to the bottom of chamber 10 to enter bed D through grid 35D. The shale in bed D consists essentially of the low-carbon residue of shale which has undergone distillation in bed B and combustion in bed C and which enters bed D through well 57 substantially at the temperature of combustion bed C, which may be maintained at about 1000°–1200° F. This spent shale residue is normally disintegrated to a particle size substantially smaller than that of the fresh shale, say to a particle size of about 20–100 microns. The feed rate of the combustion-supporting gas through line 5 should, therefore, be so controlled that a superficial linear gas velocity adapted adequately to fluidize beds D and C is maintained and sufficient oxygen is supplied to generate by combustion in bed C the heat required for distillation in bed B. Gas velocities of about 0.1–1 ft. per second and an oxygen supply of about 700 to 1250 s. c. f. per ton of fresh shale charged are generally suitable for these purposes. If desired, the particle size distribution in beds C and D may be adjusted upwardly by the supply of coarser shale from cyclone 43 through line 51.

The air or similar combustion-supporting gas contacting the hot spent shale in bed D is preheated therein to a temperature of about 700°–850° F. The preheated gas then flows upwardly from level $L_d$ through grid 35C into bed C to fluidize and burn the spent shale therein which is supplied in the form of solid carbonaceous distillation residue from bed B through well 55. Hot flue gases containing a substantial amount of shale fines pass upwardly from level $L_c$ at the temperature of bed C and enter bed B through grid 35B. The hot gases and entrained solids heat the shale in bed B to distillation temperatures of about 800°–1000° F. The kerogen is decomposed to lower boiling products which are vaporized. The vapors so developed are carried by the flue gases upwardly through bed B to fluidize the same and are withdrawn upwardly from level $L_b$ substantially at the temperature of bed B.

It will be appreciated that some oil shales will carry after complete retorting, more than sufficient residual combustible material to supply the heat requirements. If bed D is carried at a temperature above its ignition point, which may be of the order of 500° F., combustion will occur in bed D. For this reason it may then be desirable to dispense with bed D. Alternatively, cooling coils which may generate steam useful in the overall installation may be installed in either bed C or D. By this means the temperature of bed D may be maintained below the ignition point, and the operation carried on essentially as with shales which do not leave excess residual combustible material. However, this technique reduces the air preheat and lowers the thermal efficiency of the operation, and utilization of cooling coils in bed C, whereby all combustible material is burned off therein without overheating the bed, may be preferable.

A dilute suspension of shale fines in a mixture of flue gases and vaporous distillation products enters tubes 25 wherein the major part of the condensable distillation products is condensed as a result of indirect heat exchange through surfaces 20 with the fresh fluidized shale in bed A, which is preheated thereby to a temperature of about 300°–400° F. Simultaneously, appreciable quantities of water after association with shale may be driven off in this manner.

As oil droplets condense in tubes 25 they are carried by the stream of rising gases out of the tubes and through pipe 29 into a gas liquid separator 61 which may be of the cyclone type from which the liquid may be collected as product through line 63. Under normal operating conditions about 70–85% of the liquid product may be recovered in this manner.

As mentioned above, each tube 25 may be provided with an annular trough 26 to collect any liquid that may tend to run down surfaces 20. As the small trough fills, the liquid overflows into a central region of extremely high gas velocity so that it will be carried upward and out of chamber 10 to cyclone 61 as described above. Tubes 25 are so designed as to provide relatively high gas velocities of the order of 15–150 ft. per second, thus improving heat transfer coefficient and assuring entrainment of condensed liquid product. If desired, provision for draining the annular trough 26 to the outside of chamber 10 may be made in order to prevent excessive cycling of the oil up and down the tubes. This may be done in any suitable manner obvious to those skilled in the art and does not require specific illustration in the drawing.

The gases leaving cyclone 61 may be subjected to further cooling by conventional exchangers indicated schematically at 65 so as to obtain maximum recovery of condensable products through line 67. At least a portion of the tail gas leaving exchangers 65 may be passed through line 69, compressed in compressor 71 and introduced through line 3 as fluidizing gas for bed A as described above.

The system illustrated in Figures 1–4 permits of various modifications. While chamber 10 is diagrammatically shown to be of uniform diameter, it may be desirable to design chamber 10 so as to establish certain gas velocities in the various beds A, B, C and D. For example, the air preheat bed D, the burning bed C and the distillation bed B may be designed for superficial linear gas velocities in the range of 0.5–1.5 ft. per second at the gas supply rates required for an adequate heat supply. On the other hand, the product cooling bed A should be designed so as to permit somewhat higher gas velocities of the order of 2–4 ft. per second, in as much as the fresh shale charge has the relatively coarsest particle size. To compensate for the increase in flow velocity caused by the distillation vapors generated in bed B, this bed has preferably a somewhat larger diameter than either beds C or D so that excessive solids entrainment in bed B may be avoided.

It will also be appreciated that more or fewer than the four beds illustrated may be used provided the countercurrent character of the system with respect to distillation and product cooling zones is retained. For example, combustion and distillation may be carried out in a single bed and the air preheating bed D may be replaced by heat recovery in an external exchanger. On the other hand, distillation and/or combustion each may be carried out in a plurality of countercurrently operated beds as will be understood by those skilled in the art. Beds B, C and D may also form superimposed zones of a contiguous fluidized solids column, rather than being separated by dilute phases as illustrated in the drawing.

While tubes 25 are shown to be connected to pipe 29 by a plurality of headers 27, it will be understood that the invention is not limited to this design. Tubes 35 may either be individually connected with pipe 29 or they may be connected with a single pancake type header provided with passageways permitting the withdrawal of fluidizing gas from bed A. Other modifications may appear to those skilled in the art without deviating from the spirit of the invention.

Figures 5, 6:
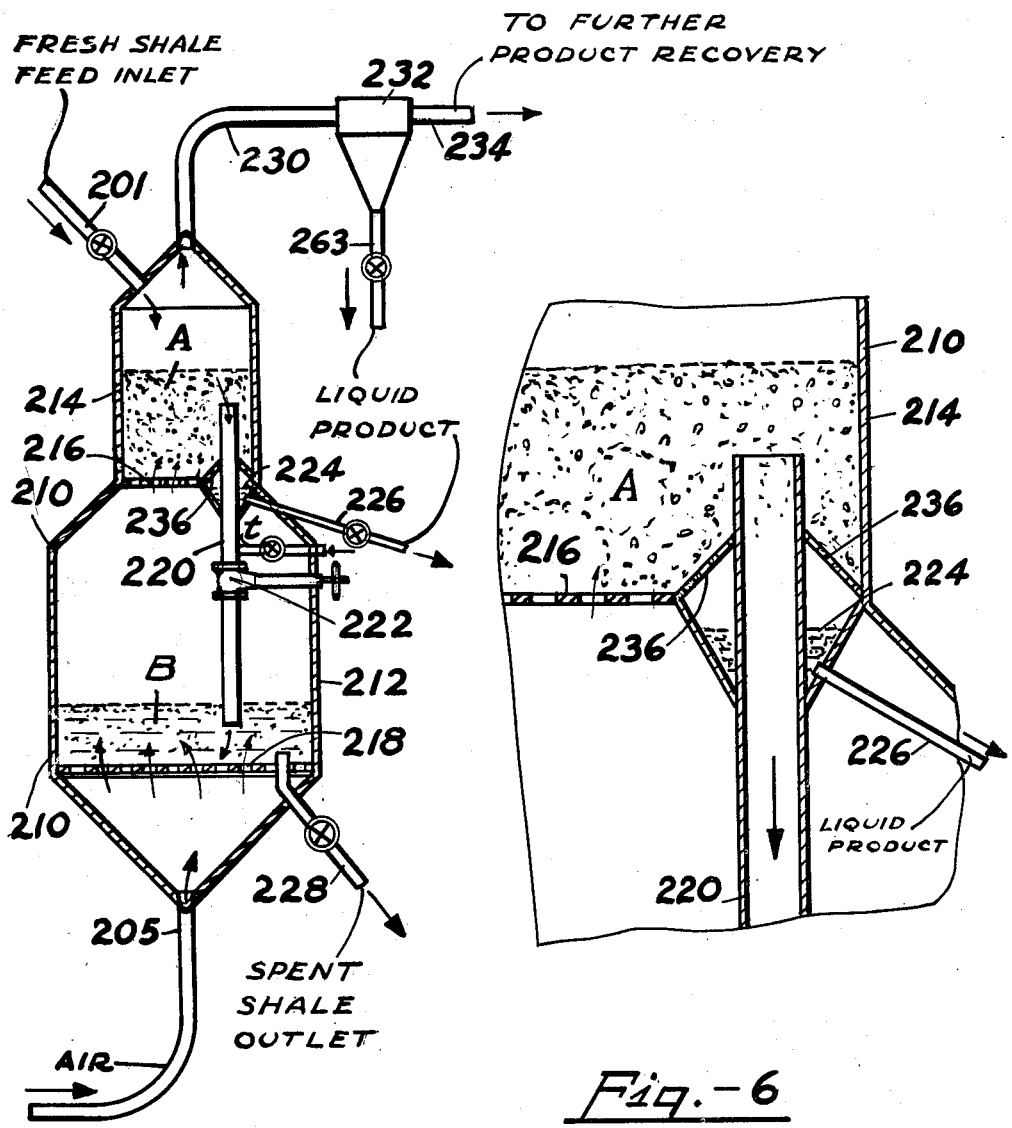
Figure 5 illustrates a system using direct heat exchange between fluid solids and distillation products for the purposes of the invention.
Figure 6 shows a detail of Figure 3 on an enlarged scale.

Referring now to Figures 5 and 6, the system illustrated therein is adapted to carry out an embodiment of the invention involving direct heat exchange between the fresh solids charge and the distillation vapors. The treating chamber 210 comprises a lower distillation and combustion section 212 having a relatively large diameter and an upper product cooling and shale preheating heat exchange section 214 having a relatively small diameter. The two sections are separated by a grid 216 and another grid 218 is arranged in the lower portion of section 212. An overflow well 220 provided with a slide valve 222 connects the two sections in a manner similar to that shown for wells 37, 55 and 57 of Figure 1. An annular trough 224 is arranged around well 222 in the bottom of section 214 as shown in greater detail in Figure 6 on an enlarged scale. A solids feed line 201 leads into an upper portion of section 214, a gas feed line 205 leads into a lower portion of section 212 at a point below grid 218, a liquid withdrawal line 226 discharges from trough 224 and a solid withdrawal line 228 discharges from a lower portion of section 212 at a point above grid 218. A vapor and gas withdrawal line 230 leads from the top of section 214 into a cyclone separator 232 of the type of separator 61 of Figure 1.

In operation, fresh shale of relatively coarse particle size, of say about 0.5–1 in. diameter may be charged through line 201 to section 214 wherein it forms a dense turbulent bed A fluidized by the hot gases and vapors rising from section 212 and bed B. The shale in bed A may be preheated in direct heat exchange with the hot gases and vapors to a temperature sufficiently high for incipient distillation, say a temperature of about 500° F. Conversely, product vapors generated in the lower bed B are cooled and some condensation of product vapors takes place. As a result of the reduced diameter of section 214, the gas velocity in bed A is sufficiently high, say about 3–10 ft. per second, preferably about 4–6 ft. per second, depending on the shale particle size, to entrain at least a substantial proportion of the liquid condensate without carrying overhead excessive amounts of solids. These high gas velocities afford an improved heat transfer coefficient so that the height of bed A need not be excessive and may be kept at about 5 to 35 ft.

The liquid entrained and any solids carried overhead may be separated from the gases in cyclone 232 and gas and vapor leaving cyclone 232 through line 234 may be further condensed and recovered by conventional means analogous to those described in connection with Figure 1. The shale oil so recovered is exceptionally clean and of lower than normal boiling range and may consequently more easily be refined.

Ordinarily not all the liquid condensed in bed A will be entrained by the gases, if excessive solids entrainment is to be avoided. Some of the condensed liquid may, therefore, be carried by the shale through well 220 to the distillation and combustion bed B in section 212. This is not disadvantageous, however, inasmuch as such liquid will mostly be revaporized and returned to bed A, so that the ultimate effect is a cycling operation with sufficient removal of product by entrainment to balance the formation of new product.

It will also be understood that the velocity of the gases and vapors, through the openings of grid 216, is sufficiently high to prevent liquid from returning to the distillation and combustion bed B through these openings. Under some conditions it may even be desirable to operate with a semi-liquid level in part of preheating section 214. For this purpose, trough 224 is arranged at a level below grid 216 as shown in Figure 6 to provide a liquid sump protected by a screen 236 against the solids in bed A. Liquid oil gathered in trough 224 may be removed through line 226. In this manner, liquid is prevented from gathering in a continuous phase in that portion of the preheat zone above grid 216, where gas at high velocity is passing through, but may gather and coalesce to form a continuous phase in the neighborhood of the liquid sump from which the oil is recovered.

Preheated shale is withdrawn preferably from a point above trough 224 through well 220 at a rate controlled by valve 222 and facilitated by small amounts of aerating gas supplied through tap t. The preheated shale is fed to the distillation and combustion bed B wherein it is fluidized by the combined action of a combustion-supporting gas, such as air and/or oxygen, supplied through line 205 and the distillation vapors generated in bed B. Conventional gas velocities of about 0.3–1.5 ft. per second may be maintained in bed B to provide proper fluidization of the shale which may now have an average particle size of about 100–500 microns due to disintegration resulting from the decomposition of its kerogen content. The temperature in bed B is preferably maintained at about 800°–1200° F. with the aid of the combustion supported by the gas supplied through line 205. When air is used as the combustion-supporting gas, about 3500 to 6000 standard cu. ft. per ton of fresh shale charged are adequate for this purpose.

The gas in line 205 may be preheated in a separate zone in heat exchange with spent shale withdrawn through line 228 in a manner similar to that described in connection with bed D of Figure 1, or in any other suitable manner. It will also be understood that separate beds may be used for combustion and distillation as shown in Figure 1.

The systems illustrated by the drawing have been shown to provide a single air-blown vessel to carry out both distillation and heat generation and involving heat supply chiefly in the form of sensible heat of hot flue gases. It is, however, within the spirit of this invention to carry out distillation and combustion in different vessels and to use sensible heat of hot solid combustion residue circulated from the combustion zone to the distillation zone to supply the heat required by distillation while fluidizing the distillation zone with product tail gas, steam or any other suitable fluidizing gas as it is known in the art of fluid-type shale distillation. Other obvious modifications of the systems illustrated which may appear to those skilled in the art are within the scope of the invention.

The invention will be further illustrated by the following specific examples.

*Example I*

A system of the type illustrated in Figures 1–4 may be operated at the conditions and with the results tabulated below.

Shale feed rate=5000 T./S. D.
Shale assay=30 gal./ton.
Retort=22 ft. diameter, 90 ft. straight side (overall).
Shale feed temperature=100° F.
Temperature of preheated shale (line 37) =400° F.
Temperature of cooled product and flue gas (line 31) =450° F.
Temperature of retorting bed (B) =950–1000° F.
Temperature of burning bed (C) =1000–1050° F.
Temperature of air preheat bed (D) =850° F.
Air supplied (line 5) =16,800 s. c. f. m. @ 20 p. s. i. g.
Superficial velocities:
　Air preheat bed (D) =0.8 ft./sec.
　Burning bed (C) =1.4 ft./sec.
　Retort bed (B) =1.5 ft./sec.
　Product cooling bed (A) =1.1 ft./sec.
Extraneous fluidizing gas (4) =0.
Diameter of tubes in bed (A) =2″ I. D.
Number of tubes (25) =1000.
Tube length=15 ft.
Gas velocity in tubes (25) =30 ft./sec.
Heavy liquid product (line 63) =2150 B./D.
Light liquid product (line 67) =850 B./D.

*Example II*

A system of the type illustrated in Figures 5 and 6 may be operated at the conditions and with the results tabulated below.

Shale feed rate=5000 T./S.D.
Shale assay=30 gal./ton.
　Retort dimensions:
　　Retort and combustion section (212) diameter=22 ft.
　　Retort and combustion section (212) height=27 ft. straight side.
　Product cooling section (214) diameter=10 ft.
　Product cooling section (214) height=24 ft. straight side.
　Temperature retorting bed (B) =1000° F.
　Temperature product cooling bed (A) = 425° F.
　Temperature gas and liquid line (230) = 425° F.
　Air supplied (line 5) =19,000 s. c. f. m. @ 15 p. s. i. g.
Superficial velocities:
　Retorting bed (B) =1.5 ft./sec.
　Product cooling bed (A) =5 ft./sec.
Heavy liquid product recovered:
　Line 226=500 B./S.D.
　Line 263=1450 B./S.D.
Light liquid product=1050 B./S.D.

The above description and exemplary operation have served to illustrate specific embodiments of the invention but are not intended to be limiting in scope.

What is claimed is:

1. The process of distilling solids containing volatile constituents which comprises subjecting said solids to distillation temperatures in a distillation zone, passing a gas through said distillation zone to drive off vaporized volatile products, passing the mixture of gas and vaporized volatile products so produced without prior condensation in indirect heat exchange with and upwardly through a dense, turbulent, fluidized mass of subdivided fresh solids in a heat exchange zone comprising heat exchange surfaces forming narrow elongated passageways imbedded in said fluidized solids, said mixture passing upwardly through said passageways, cooling said mixture in said heat exchange zone by said heat exchange to a temperature not above that of incipient condensation of said products so as to condense a substantial portion of said products in said passageways and to preheat said fluidized solids, maintaining in said passageways a gas flow velocity high enough to entrain substantially all of said condensed products in said gas, withdrawing a suspension of condensed products in gas from said heat exchange zone, separately withdrawing preheated subdivided solids from said heat exchange zone and passing the same to said distillation zone, and withdrawing spent solids from said distillation zone.

2. The process of claim 1 in which the solids in said distillation zone are maintained in the form of a dense turbulent mass of subdivided solids fluidized by an upwardly flowing gas to resemble a boiling liquid.

3. The process of claim 1 in which said flow velocity is about 50–150 ft. per second.

4. The process of claim 1 in which said solids comprise oil shale.

5. The process of claim 1 in which said distillation temperature is about 800°–1200° F. and said condensation temperature is about 300° to 500° F.

6. The process of claim 1 in which said gas is preheated in a separate preheating zone in heat exchange with at least a portion of said spent solids.

7. The process of claim 1 in which the downward flow along said surfaces, of liquid condensed thereon within said passageways is obstructed so as substantially to prevent said condensed downwardly flowing liquid from reaching said distillation zone.

8. The process of claim 1 in which said solids are carbonaceous, wherein said solids undergoing distillation are fluidized, and wherein the heat required to maintain said distillation temperature is generated by the combustion of spent solids in a separate combustion zone with a combustion-supporting gas, flue gas produced in said combustion zone being passed upwardly through said distillation zone and passageways.

9. The process of claim 8 in which said combustion-supporting gas is preheated in heat exchange with solid residue of said combustion.

FRANK T. BARR.
WALTER A. REX.

REFERENCES CITED

The following references are of record in the file of this patent:

UNITED STATES PATENTS

| Number | Name | Date |
|---|---|---|
| 1,066,717 | Doherty | July 8, 1913 |
| 1,244,840 | Day | Oct. 30, 1917 |
| 1,357,278 | Day | Nov. 2, 1920 |
| 1,907,596 | Parr et al. | May 9, 1933 |
| 1,955,025 | Sabel et al. | Apr. 17, 1934 |
| 2,363,874 | Krebs | Nov. 28, 1944 |
| 2,396,036 | Blanding | Mar. 5, 1946 |
| 2,412,025 | Zimmerman | Dec. 3, 1946 |
| 2,444,990 | Hemminger | July 13, 1948 |
| 2,449,615 | Peck | Sept. 21, 1948 |
| 2,471,119 | Peck et al. | May 24, 1949 |